United States Patent
Campbell et al.

(10) Patent No.: US 6,438,519 B1
(45) Date of Patent: Aug. 20, 2002

(54) APPARATUS AND METHOD FOR REJECTING OUT-OF-CLASS INPUTS FOR PATTERN CLASSIFICATION

(75) Inventors: William Michael Campbell, Phoenix; Charles Conway Broun, Gilbert, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 309 days.

(21) Appl. No.: 09/584,062

(22) Filed: May 31, 2000

(51) Int. Cl.⁷ .............................................. G10L 15/06
(52) U.S. Cl. ...................................... 704/243; 704/231
(58) Field of Search .................................. 704/243, 231, 704/10; 707/2.6, 103–104, 200–206

(56) References Cited

U.S. PATENT DOCUMENTS

| | | | | |
|---|---|---|---|---|
| 5,233,681 A | * | 8/1993 | Bahl et al. ..................... | 704/251 |
| 5,428,707 A | | 6/1995 | Gould et al. | |
| 5,572,624 A | * | 11/1996 | Sejnoha ........................ | 704/251 |
| 5,680,511 A | * | 10/1997 | Baker et al. ................. | 704/257 |
| 5,729,656 A | * | 3/1998 | Nahamoo et al. ............ | 704/254 |
| 5,737,489 A | * | 4/1998 | Chou et al. .................. | 704/232 |
| 5,805,772 A | * | 9/1998 | Chou et al. .................. | 704/254 |
| 5,897,616 A | * | 4/1999 | Kanevsky et al. ........ | 379/88.02 |
| 5,937,383 A | * | 8/1999 | Ittycheriah et al. .......... | 704/242 |
| 5,946,653 A | | 8/1999 | Campbell et al. | |
| 5,950,159 A | * | 9/1999 | Knill .......................... | 704/233 |
| 5,963,940 A | * | 10/1999 | Liddy et al. .................... | 704/9 |
| 6,006,221 A | * | 12/1999 | Liddy et al. .................... | 704/2 |
| 6,161,090 A | * | 12/2000 | Kanevsky et al. ........... | 704/246 |
| 6,188,976 B1 | * | 2/2001 | Ramaswamy et al. .......... | 704/1 |
| 6,192,360 B1 | * | 2/2001 | Dumais et al. ................. | 2/101 |
| 6,195,634 B1 | * | 2/2001 | Dudemaine et al. ........ | 704/231 |
| 6,263,308 B1 | * | 7/2001 | Heckerman et al. ........ | 704/231 |

* cited by examiner

*Primary Examiner*—Richemond Dorvil
*Assistant Examiner*—Michael N. Opsasnick
(74) *Attorney, Agent, or Firm*—William E. Koch

(57) ABSTRACT

Method and apparatus rejecting out-of-class inputs for pattern classification including a list of patterns with at least one in-context pattern and a rank tolerance. An input pattern is used to generate a classifier score for each pattern in the list and the classifier scores are ranked in decreasing order. The highest ranking score for an in-context pattern is determined and if the highest ranking score is 1 the in-context pattern is selected. If the highest ranking score is not 1 it is compared to the rank tolerance. When the highest ranking score is less than the rank tolerance the in-context pattern is selected and when the highest ranking score is greater than the rank tolerance the in-context pattern is rejected. Cohorts of the highest ranking pattern are removed from the list prior to the comparison.

21 Claims, 2 Drawing Sheets

APPARATUS AND METHOD FOR REJECTING OUT-OF-CLASS INPUTS FOR PATTERN CLASSIFICATION

FIELD OF THE INVENTION

This invention relates to pattern classification, such as speech recognition in trained systems.

More particularly, the present invention relates to apparatus and method for the rejection of out-of-class inputs.

BACKGROUND OF THE INVENTION

Pattern classification systems can be used in two typical situations. A closed set situation involves a fixed set of known classes. Given an input, the classifier is required to pick the best choice from this list of classes. Alternatively, a classifier may be used in an open set manner. A general scenario for open set classification is that the classifier is presented with feature vectors from a single class. The classifier then determines if the features are from a previously known class or an unknown class. An application of the open set problem is out-of-vocabulary rejection in speech recognition. Speech recognition is used as an example herein because of its widespread knowledge and use, but it will be recognized by those skilled in the art that virtually all pattern recognition systems are equally applicable. In the speech recognition case, the recognizer has a known vocabulary; typically, the user would prefer flagging of an unknown word to misrecognition.

Using a speech recognition system as a typical example, assume that in a specific instance the system is looking for a "yes" or a "no". In many different situations, the user might utter some out-of-vocabulary sounds, such as "oh", "ah", "er", or the user might cough or clear his throat. Typically, the speech recognition system looks at components of the utterance, compares them to components of the words it is looking for, i.e., yes and no, and uses a threshold to determine whether the utterance is sufficiently close to one of the words to be positively recognized. Here the problem is two-fold. In many instances the utterance may be so close,(e.g. "oh" and "no") it is misclassified. To add to this problem, in a noise system or under noise conditions, much of an utterance may be masked or lost. Thus, while the threshold remains constant, the masking (e.g. noise, closeness of the received word, or signal, etc.) may vary substantially under different operating conditions.

Current speech recognition applications experience significant limitation in customer acceptance due to inadequate rejection of out-of-class input. However, reject options for decision rules are not a new area for pattern recognition. The optimum rejection rule for pattern recognition (Bayes rejection rule) was introduced over 30 years ago in an article by C. K. Chow, entitled "On optimum recognition error and reject tradeoff", *IEEE Trans. Inf. Theory*", IT-16, no. 1, pp. 41–46, January 1970. Nevertheless, this work, and extension to it, assume we have exact knowledge of the class statistics.

In the case of speech recognition, only an estimate of the class statistics is available to the pattern recognition system. Furthermore, when the input speech is corrupted by noise, resulting in mismatched conditions, the original probability distribution estimates are no longer good approximations to the actual distributions. Thus, the optimal Bayes reject rule in quiet conditions is no longer valid.

Recent work to improve the rejection criterion for out-of-vocabulary words has focused on likelihood ratios between in-class model scores, as well as garbage, or filler, models to model the out-of-class feature space. See for example: C. S. Ramalingam et al., "Speaker-dependent name dialing in a car environment with out-of-vocabulary rejection", *Proc. ICASSP*, pp. 165–168, 1999; A. Bayya, "Rejection in speech recognition systems with limited training", *Proc. ICSLP*, 1998; H. Boulard, B. D'hoore and J. M. Boite, "Optimizing recognition and rejection performance in wordspotting systems", *Proc. ICASSP*, pp. I-373-I-376, 1994; and R. C. Rose and D. B. Paul, "A hidden Markov model based keyword recognition system", *Proc. ICASSP*. pp. 129–132, 1990. However, a score based threshold is still employed in order to provide a mechanism for trading-off recognition and rejection error rates based on some cost function. The use of a threshold leads to significant performance degradation in severely mismatched conditions. This is due to the altered statistics of the input features, resulting in a compression of the score range.

Accordingly it is highly desirable to provide pattern recognition apparatus and a method of overcoming these problems. Further, it is highly desirable to provide apparatus and methods of overcoming the problems without substantially increasing the computations required or the amount of memory used.

BRIEF DESCRIPTION OF THE DRAWINGS

Referring to the drawings.

DESCRIPTION OF THE PREFERRED EMBODIMENT

The type of pattern classification apparatus and methods discussed herein generally are those that can be used in two typical situations. A closed set situation involves a fixed set of known classes. Given an input, the pattern classifier is required to pick the best choice from this list of classes. Alternatively, a pattern classifier may be used in an open set manner. A general scenario for open set classification is that the classifier is presented with feature vectors from a single class. An application of the open set problem is out-of-vocabulary rejection in speech recognition. Speech recognition is used as an example herein because of its widespread knowledge and use, but it will be recognized by those skilled in the art that virtually all pattern classification and/or recognition systems are equally applicable.

Figure 1:
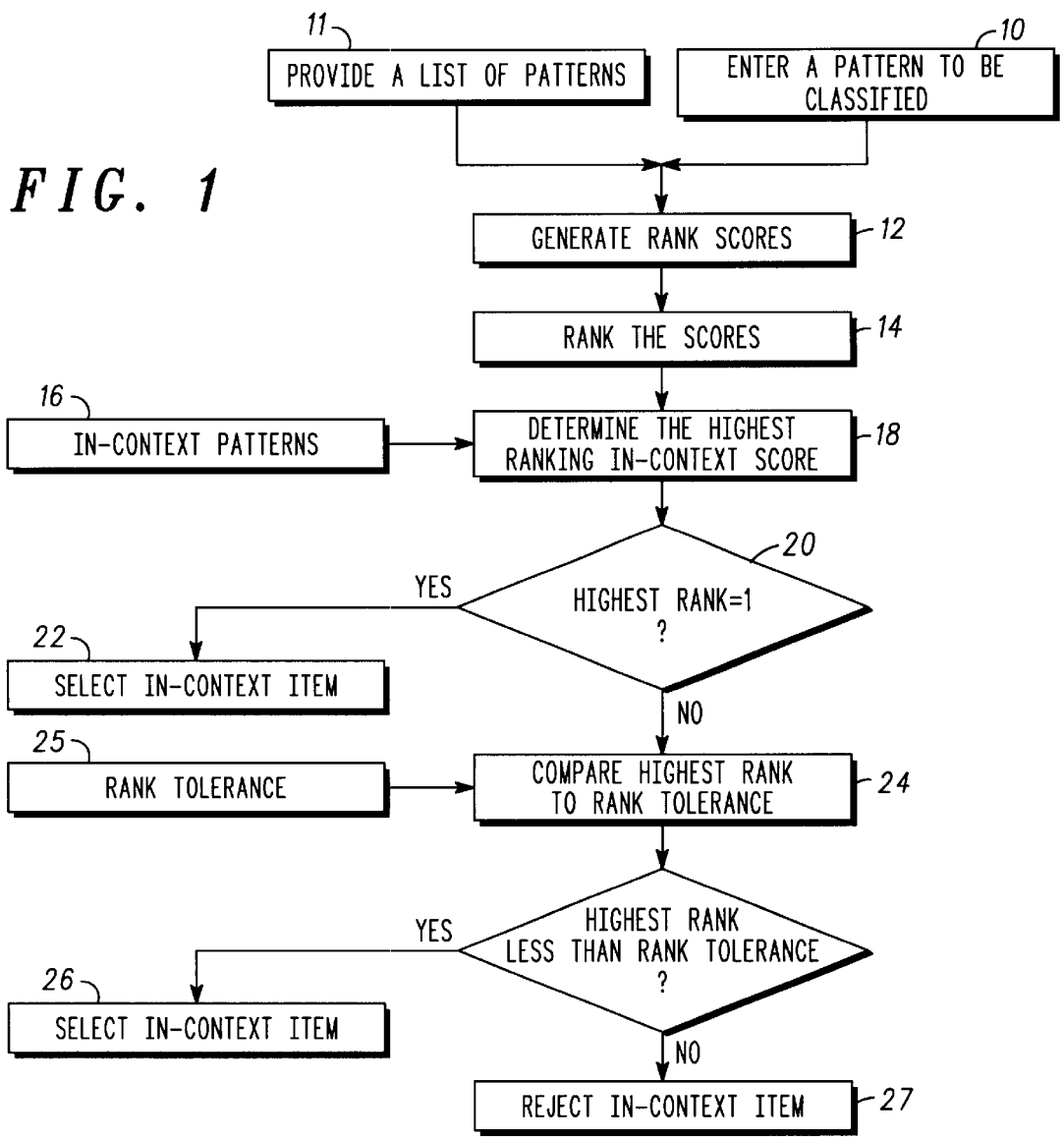
FIG. 1 is a generalized flow chart illustrating steps in a method of rejecting out-of-class inputs for pattern classification according to the present invention.

Turning now to FIG. 1, a generalized flow chart is illustrated of a method for rejecting out-of-class inputs in pattern classification in accordance with the present invention. Generally, the method begins with a step or block 10 in which a pattern to be classified is provided or otherwise entered into the system. A list of patterns is provided in block 11 including all of the patterns that may be used in the system. The list includes in-context patterns, patterns used in the specific operation being performed, and out-of-context patterns, any patterns that may be used in other operations but are out-of-context in the operation being performed.

In block 12, a similarity or similarities of the pattern to be classified with each pattern in the list of patterns is determined, by any pattern recognition scheme, comparison, etc. The similarity or similarities are scored and are then ranked in some descending order in block 14, generally with the most complete correlation being ranked one and the next closest being ranked two, etc. (it will of course be understood that the order could be reversed in some specific applications). Here it should be noted that in a pattern recognition system with no outside influences the best correlation may be nearly exact but with some pattern influencing elements in the system (e.g., depending upon the type of classifier, interference, noise, light, etc.) the highest correlation may be low. In either case the similarity or similarities are scored and ranked in some order.

In-context patterns, or in some instances a single in-context pattern, is provided in block 16 and used in block 18 to determine the highest ranking in-context pattern. In block 20, if the highest ranking in-context pattern has a ranking of one, i.e., it has the best correlation with the pattern to be classified, the pattern to be classified is selected in block 22 and the process stopped. If the highest ranking in-context pattern has a ranking greater than one (e.g., two, three, etc.), it is compared in block 24 to a selected rank tolerance, supplied in block 25. If the highest ranking in-context pattern is less than the rank tolerance it is selected in block 26, or if it is greater than the rank tolerance it is rejected in block 27.

As a specific example of the above described method for rejecting out-of-class inputs in pattern classification, assume that the method is applied to a speech recognition system, such as that described in U.S. Pat. No. 5,946,653, entitled "Speaker Independent Speech Recognition System and Method", issued Aug. 31, 1999, and incorporated herein by reference. As explained in this patent, a speech controlled system recognizes spoken commands. Typically, the spoken command is one of a group of commands represented in a command database. As a specific example, the speech controlled system can be a software application having a menu type user interface. A first spoken command selected from a menu is recognized and the next menu is displayed, a second spoken command selected from a menu is recognized and the next menu is displayed, etc. Because the speaker can control the system by speaking commands, ease of operation is improved and user friendliness is perceived.

Figure 2:
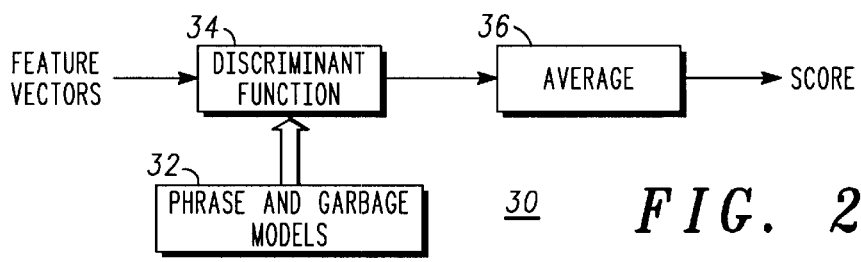
FIG. 2 is a simplified block diagram of a classifier structure in accordance with the present invention.

In the present method for rejecting out-of-class inputs in pattern classification, e.g., speech recognition, all of the commands in the system are incorporated into a single list of classes. A class includes all of the commands or vocabulary items used for a single menu, e.g., a first class including "yes" and "no", a second class including "alpha", "beta", and "gamma", etc. The list also includes classes containing spurious sounds, e.g., oh, uh, lip smacking, breath noise, coughs, etc. Generally, all of the items in the list of classes are out-of-class or out-of-context except the in-vocabulary or in-context items being used, in this example "yes" and "no". In practice, the list of classes used will be much larger so that more out-of-class situations can be detected. In this simplified example, assume that the list of classes consists of cough
yes
no
alpha
beta
gamma
yet A basic structure for a classifier 30 is illustrated in FIG. 2. The list of classes is stored in a memory 32 as phrase and garbage (e.g., spurious sounds, etc.) models. Feature vectors $x_1 \ldots x_M$ produced from feature extraction (see the above cited patent) describing an utterance to be classified are supplied to a discriminant function block 34. A discriminant function is applied to each feature vector, $x_k$, using a phrase model, $w_j$, producing a scalar output, $f(x_k, w_j)$. A final score for each phrase and garbage model is then computed by block 36

$$s_j = \frac{1}{M} \sum_{k=1}^{M} f(x_k, w_j)$$

For closed set recognition, the model realizing the highest score is output from block 36 as the recognized class. For open set recognition, the phrase and garbage model scores are further evaluated, as described below.

Classifier 30 uses a polynomial discriminant function $$f(x,w) = w'p(x).$$

The discriminant function is composed of two parts. The first part, w, is the class model. The second part, $p(x)$, is a polynomial basis vector constructed from input feature vector x. This basis vector is the monomial terms up to degree K of the input features and is the result of averaging the plurality of spoken feature vectors to produce an average command structure (see the above cited patent for additional details). For example, for a two dimensional feature vector, $x=(x_1 x_2)^t$, and K=2

$$p(x) = \{1 x_1 x_2 x_1^2 x_1 x_2 x_2^2\}^t.$$

Thus, the discriminant function output is a linear combination of the polynomial basis elements. Since w does not depend on the frame index, evaluation of the discriminant function is simplified as follows:

$$s_j = w_j^t \frac{1}{M} \sum_{k=1}^{M} p(x_k) = w_j^t \overline{p}$$

Thus, scoring a single model equates to computing an inner product. For example, given 25 features and a 2nd order (K=2) polynomial expression, w is of length 351, resulting in only 701 floating point operations (FLOPs) for each model scored. Therefore, the complexity of step 12 in FIG. 1 is substantially reduced.

The rejection criterion in the above described method is based on the use of multiple garbage models and uses a ranking tolerance (block 25 in FIG. 1), rather than a score based threshold, for noise robustness. In addition, the ranking tolerance provides the ability to tune a trade-off between recognition and rejection error rates based on the assigned tolerance. Generally the tolerance is at most 10% of the total list of classes (e.g., in a list of 100, the rank tolerance would be set at no more than 10 and typically less than 10).

Once the scores are generated, as described above or by any other selected method, and ranked, the highest scoring in-class model (in the above simplified example "yes" or "no") is determined. Cohorts of the highest scoring in-class model are then eliminated from the ranked score list. For purposes of this discussion, cohorts are patterns (e.g., words or phrases) that are sufficiently similar in at least some features to cause selection errors. There is no known general rule for selecting cohorts and it has been found that they are usually selected through systematic experimentation and use of the out-of-context rejection system. With the cohorts eliminated from the ranked scores, the rank of the highest scoring in-class model is compared to the rank tolerance. The highest scoring in-class model is selected if it is less than the rank tolerance and rejected if it is greater than the rank tolerance.

By populating the list of classes with a large number of out-of-class (i.e., garbage) models, there is a tendency to tighten the distributions around the in-class models, and to identify out-of-class regions between the in-class regions. It is important that there is a sufficient distance between the in-class and the garbage models in order to mitigate false rejection errors. To accomplish this spacing, cohorts for the in-class models are found and eliminated from the decision space. Typically, the cohorts and rank tolerance are set through a training database. The rank tolerance and the cohort selection are performed based on sample experiments with the database. It should be noted that false rejection (accidentally rejecting a true vocabulary or in-class item) and false acceptance (accepting an out-of-vocabulary or garbage item) can be traded off by adjusting the number of cohorts and the rank tolerance.

Figure 3:
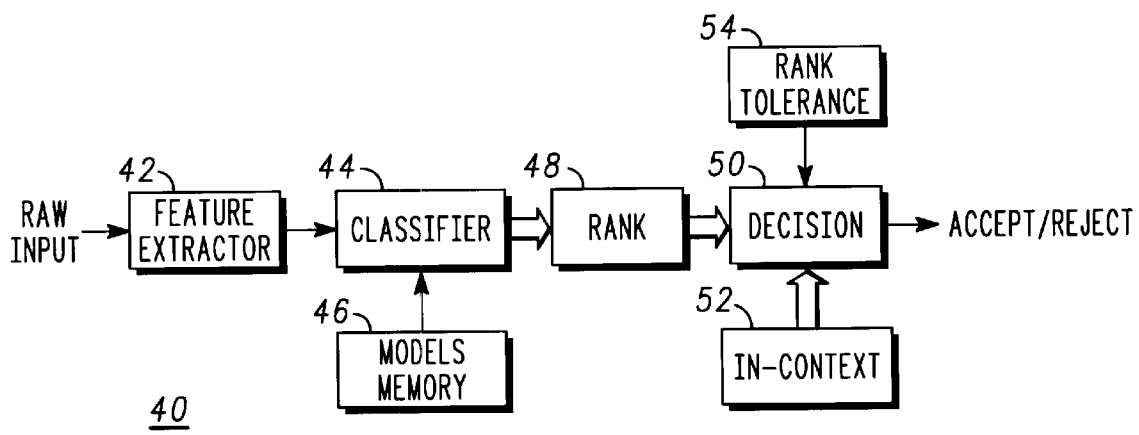
FIG. 3 is a simplified block diagram illustrating apparatus for rejecting out-of-class inputs in pattern classification in accordance with the present invention.

Turning now to FIG. 3, a simplified block diagram is illustrated of apparatus 40 for rejecting out-of-class inputs in pattern classification in accordance with the present invention. Apparatus 40 includes a feature extractor 42 having an input for receiving raw input data (i.e., a pattern to be classified). The operation of feature extractor 42, for voice recognition, is described in detail in the above cited patent and that description is included herein by reference. Feature extractor 42 can include any apparatus which converts input information (e.g., voice, sound, pixels, etc. forming a pattern to be recognized) into signals for operation by the remaining apparatus. Feature vectors or other signals from feature extractor 42 are supplied to a classifier 44, which may be similar to classifier 30 of FIG. 1. A models memory 46 is coupled to classifier 44 and includes the phrase and garbage models which are used in classifier 44 to generate the rank scores.

The rank scores are then supplied to ranking apparatus 48 which ranks the scores and supplies the ranked scores to decision apparatus 50. Apparatus 50 receives and in-context list from in-context memory 52 and determines the highest ranking in-context score. A rank tolerance is also supplied to decision apparatus 50 from apparatus 54. Apparatus 50 compares the highest ranking in-context score to the rank tolerance and selects the raw input or rejects it depending upon whether the highest ranking in-context score is above or below the rank tolerance. Here it should be noted that in some specific applications the rank tolerance can be incorporated into rank apparatus 48 directly so that only scores below the rank tolerance are provided to decision apparatus 50.

Figure 4:
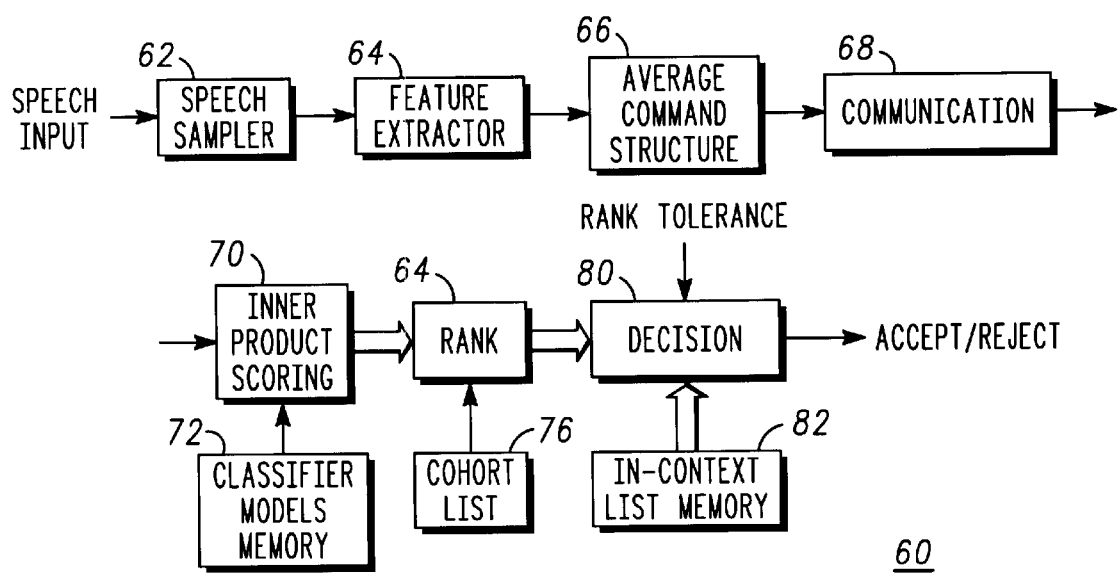
FIG. 4 is a simplified block diagram of specific out-of-class rejection apparatus for speech recognition.

Turning now to FIG. 4, a simplified block diagram is illustrated of specific out-of-class rejection apparatus 60 for speech recognition. In this specific embodiment, apparatus 60 includes a speech sampler 62 with an input for speech or an utterance to be classified, which may be any of the well known apparatus such as a microphone, telephone, or any other device for converting speech to electrical impulses. Speech sampler 62 then samples the input speech at some convenient rate to essentially convert the analog signals to digital signals. Signals from speech sampler 62 are supplied to a feature extractor 64 which converts the speech or utterance to be classified to feature vectors as described above and in the above cited patent. The feature vectors are then averaged in averaging apparatus 66 to produce an average command structure for the utterance to be classified as described in the above cited patent. The average command structure is communicated over any convenient communication link 68 to inner product scoring apparatus 70. Here it should be noted that link 68 could be the internet, a telephone, a direct connection, or any other means of carrying the output signals from apparatus 66 to apparatus 70 (this is also true for each of the blocks 62 and 64).

As described above, inner product scoring apparatus 70 converts the feature vectors and the various models (in-context and garbage models stored in memory 72) to scores with a minimum of computation. Here it should be noted that either or both apparatus 66 and apparatus 70 (along with much of the remaining apparatus) can be conveniently implemented in a DSP, a custom chip, or any of the many computer chips available on the market. Scores from apparatus 70 are supplied to rank apparatus 74, which ranks the scores in a decreasing order, generally with the highest ranking score being first on the list. A cohort list from a memory 76 is also supplied to rank apparatus 74. During the ranking of the scores in apparatus 74, cohorts of the utterance to be classified are eliminated from the list of scores. The list of scores is then supplied to decision apparatus 80, which also receives a rank tolerance input (or setting) and an in-context list from memory 82. As explained above, the highest ranking score is compared to the rank tolerance and the utterance to be classified is accepted or rejected.

In a somewhat different use or application of the above described apparatus and method of rejecting out-of-class inputs, a verification system can be provided. In the verification system, a password (e.g., a spoken phrase, spoken set of numbers, etc.) is used. The list of classes includes the password spoken by a plurality of known (in-class) or acceptable people and a plurality of unknown people (imposters). In operation or common usage, one of the known people speaks the password into the verification system. Using apparatus 40 of FIG. 3, feature extractor 42 converts the voice to feature vectors which are supplied to classifier 44. Feature vectors for the password spoken by the known (in-class) people and the unknown people are stored in memory 46. Classifier 44 converts the feature vectors of the spoken password and the stored feature vectors into scores which are ranked in apparatus 48. Decision apparatus 50 then decides whether to accept or reject the individual using a rank tolerance and in-context memory, as described above.

Thus, new and improved apparatus and a method of rejecting out-of-class inputs for pattern classification has been disclosed. The new and improved apparatus and method are based on the use of multiple out-of-context or garbage and a novel ranking scheme to achieve robust performance far superior to prior art apparatus and methods incorporating thresholds. The new and improved apparatus and method are robust to noise and are compact and easy to implement.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of rejecting out-of-class inputs for pattern classification comprising the steps of:

providing a list of patterns including at least one in-context pattern;

providing a rank tolerance;

obtaining a pattern to be classified;

generating a classifier score for each pattern in the list of patterns;

ranking the classifier scores in decreasing order;

determining the highest ranking score for an in-context pattern; and when the highest ranking score for the in-context pattern is one selecting the in-context pattern, when the highest ranking score for the in-context pattern is not one comparing the highest ranking score to the rank tolerance, when the highest ranking score for the in-context pattern is less than the rank tolerance selecting the in-context pattern, and when the highest ranking score for the in-context pattern is greater than the rank tolerance rejecting the in-context pattern.

2. A method of rejecting out-of-class inputs for pattern classification as claimed in claim 1 wherein the step of providing the rank tolerance includes providing a rank tolerance of at most 10% of the list of patterns.

3. A method of rejecting out-of-class inputs for pattern classification as claimed in claim 1 including in addition a step of discarding from the list of patterns all cohorts for the in-context pattern with the highest ranking score prior to the step of comparing the highest ranking score to the rank tolerance.

4. A method of rejecting out-of-class inputs for pattern classification as claimed in claim 3 further including a step of adjusting the number of cohorts and the rank tolerance so as to trade off false rejections and false acceptance.

5. A method of rejecting out-of-class inputs for pattern classification as claimed in claim 1 wherein the step of generating the classifier score for each pattern includes generating a plurality of feature vectors for the pattern to be classified and averaging the plurality of feature vectors to produce an average command structure.

6. A method of rejecting out-of-class inputs for pattern classification as claimed in claim 5 wherein the step of generating the classifier score for each pattern includes storing each pattern of the list of patterns as a model vector.

7. A method of rejecting out-of-class inputs for pattern classification as claimed in claim 6 wherein the step of generating the classifier score for each pattern includes using a polynomial discriminant function including the average command structure and each model vector to generate an inner product.

8. A method of rejecting out-of-class inputs for pattern classification comprising the steps of:

providing a list of classes including a plurality of in-vocabulary items;

providing a rank tolerance;

obtaining a speech utterance;

performing feature extraction on the speech utterance;

generating from the feature extraction a classifier score for each item in the list of classes;

ranking the classifier scores in decreasing order;

determining the in-vocabulary item with the highest ranking score; and when the highest ranking score for the in-vocabulary item is one selecting the in-vocabulary item, when the highest ranking score for the in-vocabulary item is not one comparing the highest ranking score to the rank tolerance, when the highest ranking score for the in-vocabulary item is less than the rank tolerance selecting the in-vocabulary item, and when the highest ranking score for the in-vocabulary item is greater than the rank tolerance rejecting the in-vocabulary item.

9. A method of rejecting out-of-class inputs for pattern classification as claimed in claim 8 wherein the step of providing the rank tolerance includes providing a rank tolerance of at most 10% of the list of classes.

10. A method of rejecting out-of-class inputs for pattern classification as claimed in claim 8 including in addition a step of discarding from the list of classes all cohorts for the in-vocabulary item with the highest ranking score prior to the step of comparing the highest ranking score to the rank tolerance.

11. A method of rejecting out-of-class inputs for pattern classification as claimed in claim 10 further including a step of adjusting the number of cohorts and the rank tolerance so as to trade off false rejections and false acceptance.

12. A method of rejecting out-of-class inputs for pattern classification as claimed in claim 8 wherein the step of generating the classifier score for each item includes generating a plurality of feature vectors for the speech utterance and averaging the plurality of feature vectors to produce an average command structure.

13. A method of rejecting out-of-class inputs for pattern classification as claimed in claim 12 wherein the step of generating the classifier score for each item includes storing each item of the list of classes as a model vector.

14. A method of rejecting out-of-class inputs for pattern classification as claimed in claim 13 wherein the step of generating the classifier score for each item includes using a polynomial discriminant function including the average command structure and each model vector to generate an inner product.

15. Apparatus for rejecting out-of-class inputs in pattern classification systems comprising:

a feature extractor coupled to receive an input pattern to be classified and to output features of the input pattern;

a models memory having a plurality of models stored therein;

a classifier coupled to the feature extractor and to the models memory, the classifier being designed to receive the features of the input pattern from the feature extractor and to receive each of the plurality of models from the models memory and provide a classifier score for each of the plurality of models;

rank circuitry coupled to the classifier, the rank circuitry ranking the classifier score for each of the plurality of models; and decision circuitry coupled to receive the ranking of the classifier scores from the rank circuitry, the decision circuitry including an adjustable rank tolerance and in-context memory, the decision circuitry being designed to select the highest in-context score from the ranking, compare the highest in-context score to the rank tolerance and determine one of accepting and rejecting the highest in-context score.

16. Apparatus for rejecting out-of-class inputs in pattern classification systems as claimed in claim 15 wherein the feature extractor, the models memory, the classifier, the rank circuitry, and the decision circuitry are included in a semiconductor chip.

17. Apparatus for rejecting out-of-class inputs in pattern classification systems as claimed in claim 15 wherein the feature extractor includes apparatus for converting the input pattern to a plurality of feature vectors.

18. Apparatus for rejecting out-of-class inputs in pattern classification systems as claimed in claim 17 wherein the models stored in the models memory are stored as model vectors.

19. Apparatus for rejecting out-of-class inputs in pattern classification systems as claimed in claim 18 wherein the classifier includes apparatus using a polynomial discriminant function including the average command structure and each model vector to generate an inner product.

20. Apparatus for rejecting out-of-class inputs in pattern classification systems as claimed in claim 15 including a stored list of cohorts coupled to one of the rank circuitry and the decision circuitry, the one of the rank circuitry and the decision circuitry discarding from the list of classes all cohorts for the in-vocabulary item with the highest ranking score prior to comparing the highest ranking in-context score to the rank tolerance.

21. Apparatus for rejecting out-of-class inputs in pattern classification systems as claimed in claim 20 wherein the stored list of cohorts and the rank tolerance are adjustable so as to trade off false rejections and false acceptance.

* * * * *